No. 790,364. Patented May 23, 1905.

UNITED STATES PATENT OFFICE.

JOHN HAGENBACH, OF BASEL, SWITZERLAND, ASSIGNOR TO ANILINE COLOUR AND EXTRACT-WORKS, FORMERLY JOHN H. GEIGY, OF BASEL, SWITZERLAND.

AZO DYE AND PROCESS OF MAKING SAME.

SPECIFICATION forming part of Letters Patent No. 790,364, dated May 23, 1905.

Application filed November 1, 1904. Serial No. 231,033.

*To all whom it may concern:*

Be it known that I, JOHN HAGENBACH, Ph. D., a citizen of the Swiss Republic, residing at Basel, Switzerland, have invented certain new and useful Improvements in Azo Compounds and Processes of Making Same, of which the following is a specification.

The invention relates to the manufacture of new azo dyes of the naphthalene series, very soluble in water, by sulfonation of the oxyazo dyes obtained by combination of diazonaphtholsulfo-acids with naphthol. These dyestuffs yield on wool dyed in the usual manner and subsequently treated with chromic compounds blue-black shades of very valuable properties.

The coloring-matter obtained by copulation of the 1-diazo-2-naphthol-4-sulfonic acid resp. of its anhydrid with beta-naphthol dyes wool when after-treated with chrome in blue-black shades of remarkable fastness; but on account of its insufficient solubility in acetic-acid solution its application for dyeing in apparatus causes some difficulties. In order to bring this coloring-matter into a more soluble form, I have tried to transform it into a sulfonic acid by action of concentrated sulfuric acid, and I have found that when avoiding too high temperatures, which cause the decomposition of the coloring-matter, the sulfonation can be accomplished very easily by aid of concentrated sulfuric acid, especially when mixed with a certain proportion of anhydrous sulfuric acid. The thus-obtained new coloring-matter is extremely soluble in water, but shows, nevertheless, the same excellent solidity against milling and potting as the original coloring-matter. Besides the advantage of the remarkable solubility the new coloring-matter possesses all the same good qualities of the starting stuff.

In the following example the proportions and quantities may of course be varied to a certain extent without changing the result.

The process may be carried out, for instance, as follows:

Example: One part of the coloring-matter obtained by copulation of the anhydrid of 1-diazo-2-naphthol-4-sulfonic acid with beta-naphthol precipitated from its alkaline solution by the addition of acetic acid dried and powdered is slowly introduced while stirring into three parts of monohydrate of sulfuric acid at about 30° to 40° centigrade. The coloring-matter partly dissolves. Partly it turns into small needles of a greenish metallic luster. Then I add slowly while constantly stirring one part of fuming sulfuric acid, (containing twenty-five per cent. anhydrid,) whereupon the mixture becomes thin and the temperature rises up to 65° to 70° centigrade. The stirring is continued at this temperature till a test is well soluble in cold water. The mixture is then poured into ice-water, precipitated with kitchen-salt, filtered off, washed with a diluted solution of common salt, dried, and powdered.

The thus-obtained coloring-matter forms a dark powder of a greenish metallic luster easily soluble in cold water with a raspberry-red color, turning into a pure blue by addition of ammonia. By concentrated hydrochloric acid the solution is precipitated in brownish-violet flocks. In concentrated sulfuric acid the coloring-matter dissolves with a dark-blue shade. On wool it yields in an acetic-acid bath a brownish-red shade, turning into a blue-black when treated after dyeing with chromium compounds and into a violet-black with copper salts.

Having now described my invention, what I claim is—

1. The process of making monoazo dyes, very soluble in water, consisting in the sulfonation of azo dyestuffs obtained by combination of the anhydrids of diazo naphtholsulfonic acids with naphthol.

2. The process of making a monoazo dye, very soluble in water, consisting in the sulfonation of the azo dyestuff obtained by combination of the anhydrid of 1-diazo-2-naphthol-4-sulfonic acid with beta-naphthol.

3. As a new article of manufacture, the monoazo dye which results by sulfonation of the azo dyestuff obtained by combination of the anhydrid of 1-diazo-2-naphthol-4-sulfo-acid with beta-naphthol, forming a dark powder of a greenish metallic luster, easily soluble in cold water with a raspberry-red color turning into a pure blue by addition of ammonia, soluble in concentrated sulfuric acid with a dark-blue shade, precipitated by concentrated hydrochloric acid from the alkaline solution in brownish-violet flocks and yielding on wool in acetic-acid bath brownish-red shades, turning into a blue-black when treated after dyeing with chromium compounds and into a violet-black with copper salts.

In testimony whereof I have signed my name to this specification in the presence of two subscribing witnesses.

JOHN HAGENBACH.

Witnesses:
　GEO. GIFFORD,
　ALBERT GRACHER.